United States Patent
Reed, Jr.

(10) Patent No.: US 6,799,259 B1
(45) Date of Patent: Sep. 28, 2004

(54) SECURITY SYSTEM FOR DATA PROCESSING APPLICATIONS

(76) Inventor: John H. Reed, Jr., 3140 County Rd. 101, Wayzata, MN (US) 55391

( * ) Notice: Subject to any disclaimer, the term of this patent is extended or adjusted under 35 U.S.C. 154(b) by 244 days.

(21) Appl. No.: 10/075,220

(22) Filed: Feb. 13, 2002

Related U.S. Application Data

(63) Continuation-in-part of application No. 09/671,410, filed on Sep. 27, 2000.

(51) Int. Cl.[7] ............................................. G06F 12/00
(52) U.S. Cl. ...................... 711/163; 711/112; 713/200; 713/1
(58) Field of Search ......................... 711/111, 112, 114, 711/162, 163, 164; 700/83; 713/200, 201, 202, 1, 2

(56) References Cited

U.S. PATENT DOCUMENTS

| | | | | |
|---|---|---|---|---|
| 4,734,851 A | * | 3/1988 | Director .................... | 711/154 |
| 5,012,514 A | | 4/1991 | Renton ..................... | 713/192 |
| 5,075,884 A | | 12/1991 | Sherman et al. ............ | 713/200 |
| 5,144,660 A | | 9/1992 | Rose ........................ | 713/200 |
| 5,434,562 A | | 7/1995 | Reardon .................... | 713/200 |
| 5,483,649 A | | 1/1996 | Kuznetsov et al. .......... | 713/200 |
| 5,542,044 A | | 7/1996 | Pope ........................ | 713/200 |
| 5,559,993 A | | 9/1996 | Elliott et al. ................ | 711/163 |
| 5,657,470 A | | 8/1997 | Fisherman et al. ......... | 711/153 |
| 5,850,340 A | * | 12/1998 | York ........................ | 700/83 |
| 5,894,551 A | | 4/1999 | Huggins et al. ............ | 713/201 |
| 5,894,552 A | | 4/1999 | Bouthiller et al. .......... | 713/201 |
| 5,896,499 A | | 4/1999 | McKelvey ................. | 713/201 |
| 5,944,822 A | | 8/1999 | Cornils ..................... | 713/200 |
| 5,969,632 A | | 10/1999 | Diamant et al. ............ | 340/5.3 |
| 6,026,502 A | | 2/2000 | Wakayama ................ | 714/138 |
| 6,038,667 A | | 3/2000 | Helbig, Sr. ................ | 713/200 |
| 6,195,695 B1 | * | 2/2001 | Cheston et al. ............ | 709/221 |

OTHER PUBLICATIONS

Tanenbaum, "Structured Computer Organization", © 1984 Prentice–Hall, Inc., pp. 10–12.*

* cited by examiner

*Primary Examiner*—Donald Sparks
*Assistant Examiner*—Brian R. Peugh
(74) *Attorney, Agent, or Firm*—Haugen Law Firm PLLP

(57) ABSTRACT

A system for dynamically controlling activation status of multiple data storage structures in a single computer so that a single computer can be dynamically configured using two or more hard drives, each with its own disk operating system. The system includes a means for selectively automatically toggling between active data storage structures and inactive data storage structures. In a preferred embodiment of the present invention, the dynamic controlling means can dynamically switch activation status without re-booting or re-powering the computer.

12 Claims, 7 Drawing Sheets

SECURITY SYSTEM FOR DATA PROCESSING APPLICATIONS

CROSS-REFERENCE TO RELATED APPLICATIONS

This application is a continuation-in-part of my co-pending U.S. patent application Ser. No. 09/671,410, filed on Sep. 27, 2000 and entitled SECURITY SYSTEM FOR DATA PROCESSING APPLICATIONS, the content of which is herein incorporated in its entirety.

FIELD OF THE INVENTION

The present invention relates to security systems for computer-related applications generally, and more particularly to methods for isolating data in data processing applications.

BACKGROUND OF THE INVENTION

An ever-present issue associated with computers and computer-related applications is the security of data stored within the computers. Typically, electronic data is magnetically stored in specific physical locations within the computers. Examples of such physical locations include hard drives or hard disks, random access memory (RAM), and read-only memory (ROM). Electronic data may also be stored on portable devices such as floppy disks, recordable tapes, and compact digital disks. Such data may also be stored on a central database, which database is housed in a physically distinct structure and connected to a plurality of remote computers via electrical transmission means. The data in the central databases may then be remotely accessed and manipulated by a remote computer user at any time. Once the user is finished with the data, it can be re-saved to the database or deleted altogether.

Each category of data storage locations has particular characteristics which, in sum, provide a full spectrum of storage capabilities. Hard drives or hard disks are usually utilized to hold data that is intended to be kept in the computer on a quasi-permanent basis. As such, data in respective hard disks is maintained until specifically deleted, whether the respective computer is powered on or not.

A common modality for computer systems used in a variety of applications is the utilization of one or more hard disks. Such hard disks may be used to store a variety of information, such as operating system software, application software, drivers for various peripheral attachments, and data used by the various application program software. Operation system software typically resides on the "boot" hard disk. In the present systems, there is generally only one hard disk that may be designated as the "boot" hard disk. Such operating system software typically controls all computer functions, and it is usually the software through which all application software is executed.

Other hard disks connected to a respective computer are generally designated by the operating system software as data disks. If these additional hard disks also contain operating system software, such hard disks may only be utilized as the "boot" disk if the "boot" designation is reassigned and the operating system software has been booted up for use.

Random access memory is typically used as a temporary holding location for data viewed by the computer user. Information in the RAM is usually erased each time the respective computer is turned off. Internal computer instructions driving systems such as the boot up sequence, saving sequence, etc. are normally stored in the read only memory. Information in the ROM may be accessed by a computer user, but may not usually be manipulated.

In most applications, the most preferred mode of data storage maintains the information for as long as the computer operator desires. Accordingly, hard disks and central data repositories have become critically important in the field of data storage and management.

In many applications today, computers containing stored data are operably coupled to external communication means for communicating over a global computer network such as the internet. Such communication means may include telephone lines, digital service lines (DSL), dedicated digital fiber optic lines, cable and satellite links. When the communication means are active, information may be transferred between remote computers and central data repositories. Information received by such remote computers may be viewed temporarily, or may be stored in particular memory devices in the computers. As stated above, hard disks within the computers are typically utilized in situations where relatively long-term data storage is desired. Data imported from external databases is therefore regularly stored in hard disks, in which locally generated data is also held. Such imported and local data are generally commingled in the hard disk, wherein no physical separation exists between the two types of data. The same scenario is true in a central database, in that data from various sources is stored in common memory structures.

With the advent of computer networks allowing multiple computers to simultaneously communicate and receive information from one another, data security has become an increasingly important issue. Remote computers connected to such networks routinely store, or "download", data received through network communication channels. Such data may sometimes contain rogue computer instructions, often referred to as "viruses". The imported viruses are unwittingly stored to hard disks and databases along with the remainder of the imported data. Once the viruses are in the storage structures, the coded set of instructions defining the viruses automatically initiate, thereby causing the computer to carry out the instructions. These instructions may be relatively harmless, or may be totally destructive to key portions of the host computer. Often times, such viruses act to destroy other stored data in the memory structure at issue.

Computers connected to networks may also be susceptible to unauthorized users accessing stored information. In some cases, unauthorized users may be able to gain access to particular computers via respective network connections and subsequently take control of such computers. Once access to the computers has been achieved, the unauthorized user can remotely access software and data stored in those computers, and can read, write or erase any or all associated data or application software, thereby compromising the security of such computers.

Various systems have been implemented to counteract such security breaches, but have been met with only limited success. Anti-virus software has been developed to detect particular series of instructions that may constitute a virus. Such software scans data before the data is stored to find any suspicious instructions. If these instructions are detected, the virus software may automatically delete them, or may alert a system manager to the potential problem.

Most anti-virus programs in use today, however, can only efficiently detect known viruses or known virus instruction patterns. Thus, newly developed viruses having unique instruction patterns may not be detected by the anti-virus software programs. In addition, anti-virus programs may be circumvented by being attached to documents or other data groups which are not scanned by the anti-virus procedure. Such anti-virus software programs, therefore, do not typically form a complete barrier to the incursion of virus programs in sensitive computer memory structures.

Network security software has also been developed to provide security measures protecting particular computer network connections. Such software may provide, for example, encryption techniques, password-enabled security gates, and other tools for identifying the user requesting access to a particular network connection. To access a protected computer, a user typically needs to provide certain information given only to authorized users of the computer.

Some users, however, who do not have such information may still be able to access the protected computer by utilizing techniques to discover the information and subsequently use it to access the computer, or by utilizing techniques that allow the unauthorized user to circumvent or disable the security software. Once past the gate defined by the security software, the unauthorized user can access data stored on the computer, thus compromising the privacy of such data. The essence of the present invention is to make such access virtually impossible.

As discussed above, existing methods for protecting and securing electronic data stored on computers connected to a network of computers are inadequate for securing such data. One solution to this problem is to have multiple computers designated for particular applications. For example, one computer could be designated as a WWW/internet computer, while a different computer could be designated as a non-WWW/internet computer and would never be connected to the WWW/internet. In this manner, only the WWW/internet computer would be exposed to viruses and invasion by unauthorized users. Thus, the non-WWW/internet computer could safely store private and sensitive information without risk from problems transportable via the computer WWW network.

Such a multiple computer solution, however, is undesirable, in that multiple computers are needed to perform tasks that a single computer can do. In addition, data stored in one computer would not be easily transferable to another without compromising the security of the non-network computer.

A method of protecting data stored on a computer connected to a network of computers is therefore needed in the art. Such data may be stored on an individual computer, or may be stored in a central database which is accessible by a plurality of local and remote computers.

In the past, computer hardware has generally been expensive, so solutions calling for additional hardware elements have not been preferred. Now, however, computer hardware has become relatively inexpensive, thus allowing an increase in hardware-based solutions. Therefore, a hardware-based solution to the above stated problems is both needed and desired.

It is therefore a principle object of the present invention to provide a method for securing data stored in a device that is connected to a network of computers.

It is another object of the present invention to provide a method for allowing one computer to have the discrete function of multiple computers.

It is a further object of the present invention to provide a means for dynamically switching activation status among multiple data storage structures and their individual disk operating systems within an individual computer.

It is yet a further object of the present invention to provide a means for dynamically switching activation status among multiple hard disks within an individual computer.

It is a still further object of the present invention to provide a means for disabling non-activated data storage structures so that such non-activated storage structures are not connected to a specific logical computer network.

It is a yet further object of the present invention to provide a means for allowing connection of one or more of multiple data storage structures to a computer network while preventing network connection to the remaining data storage structures.

It is yet another object of the present invention to provide a means for connecting and disconnecting communication channels between multiple data storage structures.

It is a still further object of the present invention to provide multiple data storage structures having varying levels of security within a particular computer.

It is a still further object of the present invention to provide two or more complete working computer systems from a standard PC. The PC's components along with additional hard drives are connected to the Master Control Board (MVB) and the MCB logically configures these hard drives and peripheral Internet connections so that two or more unique computer systems can be used sequentially but not simultaneously.

SUMMARY OF THE INVENTION

By means of the present invention, a system for dynamically controlling the activation status of multiple data storage structures within a single computer is provided. A preferred embodiment of the invention includes means for selectively automatically toggling between active data storage structures and inactive data storage structures.

By having both active and inactive data storage structures in a single computer, the above-identified objects are met. In some embodiments, less than all of the data storage structures are active and connected to an external computer network at any one time. Thus, data or communication being received through such a network is not directed into the deactivated storage structures, thereby securing the deactivated structures from unwanted data and communication.

In addition, the dynamic switching means allows a single computer to utilize multiple data storage structures as unique computers having distinct connections and entry authorization. The dynamic switching means further has the novel capability of activating inactive storage structures and deactivating active storage structures with only an electronic impulse initiated by the user from a remote pointer device. Furthermore, the dynamic switching means can accomplish the activation/deactivation switch without having to re-boot or re-power the computer.

An additional aspect of the present invention provides a means for developing a computer system having multiple data storage structures with varying levels of security. The dynamic switching means may be programmed to activate only the data storage structures to which a particular user has authorization. Furthermore, a system having multiple users may be programmed to allow only those users with authorization to activate restricted data control structures.

DETAILED DESCRIPTION OF THE PREFERRED EMBODIMENTS

The objects and advantages enumerated above together with other objects, features and advances represented by the present invention will now be presented in terms of detailed embodiments described with reference to the attached figures which are intended to be representative of various possible embodiments of the invention. Other embodiments and aspects of the invention are recognized as being within the grasp of those having ordinary skill in the art.

Definitions:

The term network recited herein refers to any common connection among a plurality of computers. The term non-network means the operating hardware/software system has no such common connection.

The term LAN refers to a local area network. Such LAN systems may or may not be connected to the WWW/Internet.

Figure 1:
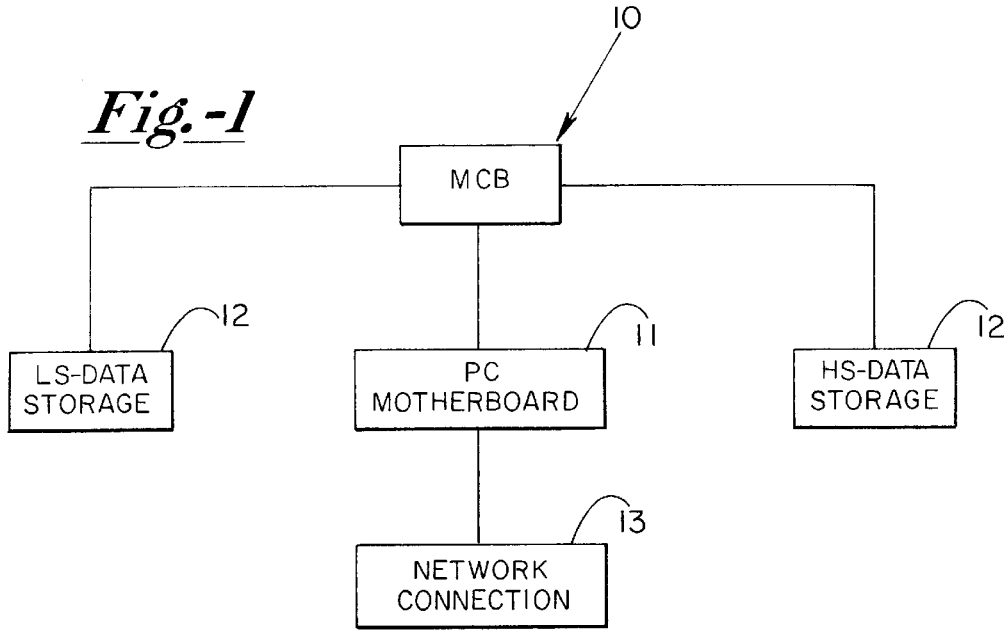
FIG. 1 is a schematic diagram showing a Master Control Board (MCB) operably connected to multiple data storage structures and a PC.

Referring now by characters of reference to the figures, and first to FIG. 1, a schematic depicting a switching means 10 operably connected to multiple data storage structures 12, which may include lower security (LS) and higher security (HS), storage structures, is shown. In preferred embodiments of the present invention, switching means 10 is a hardware/software device such as a Master Control Board (MCB), which MCB has the capability to dynamically control activation status of data storage structures. Such storage structures may include, for example, distinct hard disks in individual personal computers, selected data storage elements in a set of PC's connected to a central Server LAN database, and separate servers providing distinct Local Area Network (LAN) connections. MCB 10 is preferably logically connected to an associated motherboard 11, which motherboard 11 may be operably coupled to an external network via a network connection 13.

By dynamically controlling activation of the storage structures 12, MCB 10 can dictate which of the storage structures is activated for a particular application. For example, certain data storage structure (HS) may be designated for highly sensitive private information while other structure (LS) are designated for less sensitive private information. In addition, one or more storage structures 12 may be designated for use in receiving data from external sources through a computer connection such as the Internet. Typically, such externally-connected structures 12 contain less-sensitive information. With such a designation scheme in place, MCB 10 can be directed by the user to activate the respective storage structures 12 to a preset level of security and activity. When particular storage structures 12 are activated, MCB 10 automatically deactivates the remaining storage structures to ensure correct placement of the incoming data into the desired storage structures. Thus, the deactivated storage structures 12 are not exposed to incoming data not intended to be input into them. As such, a "firewall" is created to prevent unwanted access or data from entering deactivated storage structures 12.

In general, the MCB preferably comprises a computer board that operably couples with a motherboard bus connector in a similar manner as various computer accessory boards such as video, sound, network, and modem. Each hard disk is preferably connected to the MCB by the following: via power connectors, for example, 5 and 12 volts direct current and ground; controller cable connectors having 40/80 lines for IDE and a set of jumper pins for slave/master assignments comprising individual master pins, a master with slave pins, and a slave with master pins.

There are two preferred types of connections between the motherboard and the MCB. One preferred connection type comprises primary and/or secondary IDE cable connectors. A second preferred connection type includes a bus compatible card edge connector on the MCB, which connector couples to the motherboard bus.

Power may be supplied to the MCB through various means. Preferably, one connector is provided for hard disk power, which connector supplies power directly from a power source. Power for MCB logic, ports, switching logic, and switching components is preferably provided through an edge card of the motherboard bus.

Several logic and switching components are preferably positioned into the MCB itself, thereby operably coupling to the electronic structures of the MCB. Such components may include port communications, interrupt logic, hard disk assignments (master/slave), software initiation for control functions, password control logic, programmed restart and reboot, and programmed alarms.

An ethernet cable switch may be added to the MCB so that a respective ethernet card connection could be established. Ethernet connections may then be established between the MCB and each of the hard disks, thereby enabling the MCB to efficiently switch ethernet dedication to particular server/LAN systems.

Figure 6:
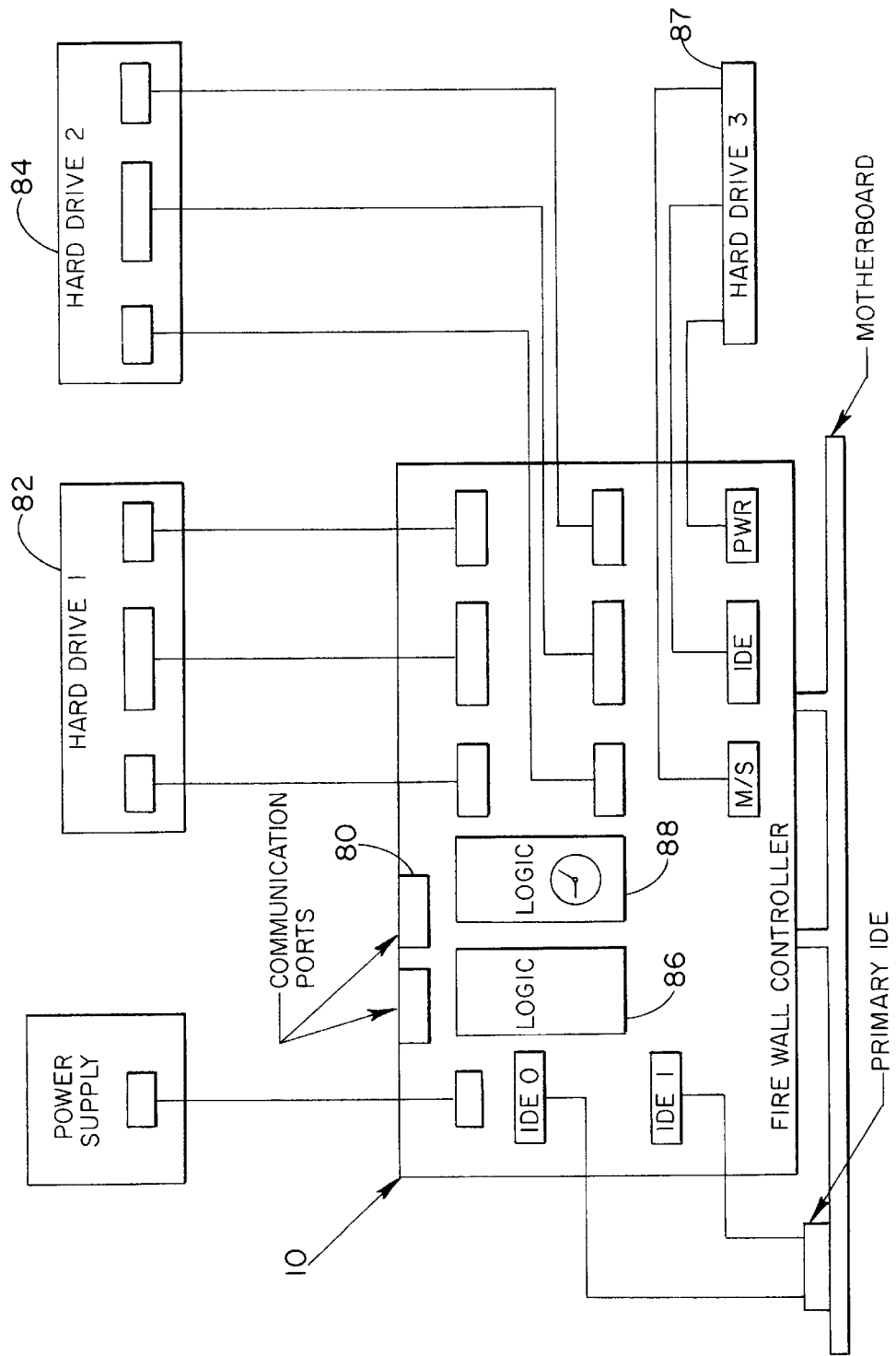
FIG. 6 is schematic diagram showing a particular embodiment of an MCB that logically controls multiple hard disks.

With reference to FIG. 6, a particular embodiment of the MCB 10 are shown. MCB 10 preferably includes one or more external communication ports 80 for connection to external device control. MCB 10 also preferably includes connections to distinct hard disks, as designated at 82, 84, 87. Network switch block 88 is provided for allowing connection to an external network only when a predetermined (LS) storage device is activated. In some embodiments of the present invention, MCB 10 may include its own hard disk 84. Logic block 86 preferably contains software and control logic for the functions of interrupt, hardware configuration and re-configuration and toggle software which stores all information that is needed for re-initiation of the application program. MCB 10 is preferably configured to allow various software such as a network browser, network support software, and other software which may be desired for particular applications to be placed on a designated network hard drive. In some embodiments, the MCB may include a toggle function so that the user may switch from MCB hard disk 84 to a distinct secure hard disk 82 or 87 without the necessity of re-booting the toggled to hard drive and its operating system.

Such an MCB 10 having an internal hard disk 84 provides user anonymity when operating in a network application by being devoid of any personal identification information. Thus, a user can operate on a network application without revealing their identification to external network users. In preferred embodiments, internal hard disk 84 has the ability to record a user's identification if desired. Thus, MCB 10 preferably provides users with a distinct system for use in network applications, while creating a virtual barrier or firewall between the network disk and the distinct hard disk 82.

Figure 2:
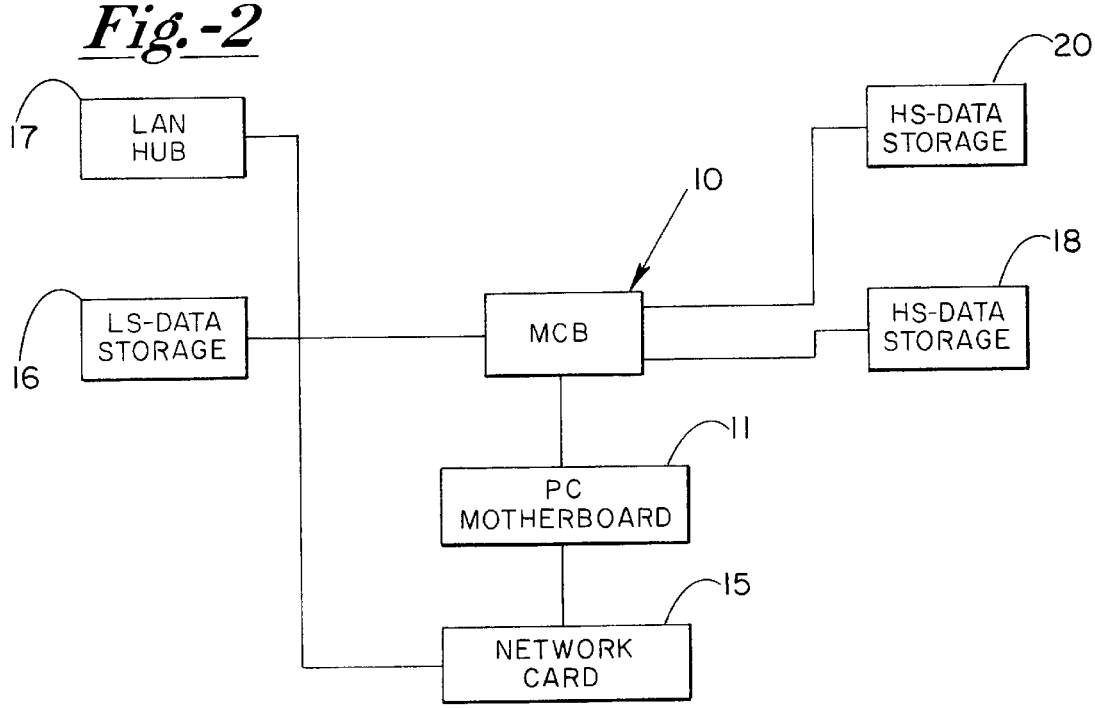
FIG. 2 is a schematic diagram showing an MCB operably connected to a LAN network and multiple distinct data storage structures.

In a preferred embodiment of the present invention, as shown in FIG. 2, MCB 10 is automatically directed to activate one or more predetermined data storage structures 16, 18, 20 depending upon the type of application being accessed. For example, an application receiving input through an external connection to a network of computers such as the internet is preferably routed through a relatively lower security (LS) storage structure 16. For other applications, particularly those conducted in an off-line environment, MCB 10 selectively automatically activates one or more relatively higher security (HS) storage structures 18, 20.

As a result of activating the network designated storage structures 16, MCB simultaneously deactivates the remaining storage structures 18, 20. Data storage structure 16, for example, may preferably be designated to receive data from sources through an external LAN network connected to the internet. Therefore, data or communication entering the host computer through an external computer network is directed to designated network storage structure 16, and has no direct access to the deactivated storage structures 18, 20.

In preferred embodiments of the invention, MCB 10 may have a plurality of distinct external network connections via motherboard 11, such that only predetermined appropriate data storage structures may be accessed while any external network connection is active. For example, a data storage structure having less important data stored thereon may be selectively activated when the computer is actively connected to an external data source such as a network. In some embodiments, varying levels of security for respective data storage structures 16, 18, 20 may be incorporated by directing MCB 10 to activate only the data storage structure having a security level commensurate with the particular application. A particular example includes a lowest data storage structure 16 being activated by MCB 10 while an external connection to a network such as the internet is active, while data storage structures 18, 20 are deactivated by MCB 10. Likewise, data storage structure 18 may be exclusively activate by MCB 10 while the computer is connected to a LAN environment. Further, MCB 10 may deactivate data storage structure 16, 18, and activate data storage structure 20 when the computer is operating in an off-line environment wherein security of information stored on data storage structure 20 is unlikely to be compromised.

In the above-described preferred embodiment, MCB 10 creates a firewall between network data storage structures 16 and non-network data storage structures 18, 20 by preventing external access to the non-network storage structures. Thus, harmful data or communication received through an external network connection may only corrupt data and systems stored on the network storage structures 16.

Computer system administrators can use the MCB activation/deactivation capability to create a hierarchical system of data storage structures having various levels of security. For example, network storage structures 16 would typically have the lowest level of security due to the fact that incoming data and communication through an external network may not be able to be adequately screened to protect information stored on the network storage structures 16. Non-network storage structures 18, 20 may also be assigned varying levels of security such that only designated users would have access to particular storage structures. In a preferred embodiment, a user is required to identify themselves (password) upon entering the computer system. MCB 10 uses this identification information to activate only the data storage structures to which the user is authorized access. MCB controlled passwords are embedded within logic module 86 (FIG. 6). MCB 10 automatically deactivates all other storage structures to which the user does not have authorization to access. Thus, MCB 10 may allow a first user to access only the network storage structure 16, while allowing a second user to access the network storage structures 16 and a medium security storage structure 18, and a third user to access all data storage structures in the computer system.

Figure 3:
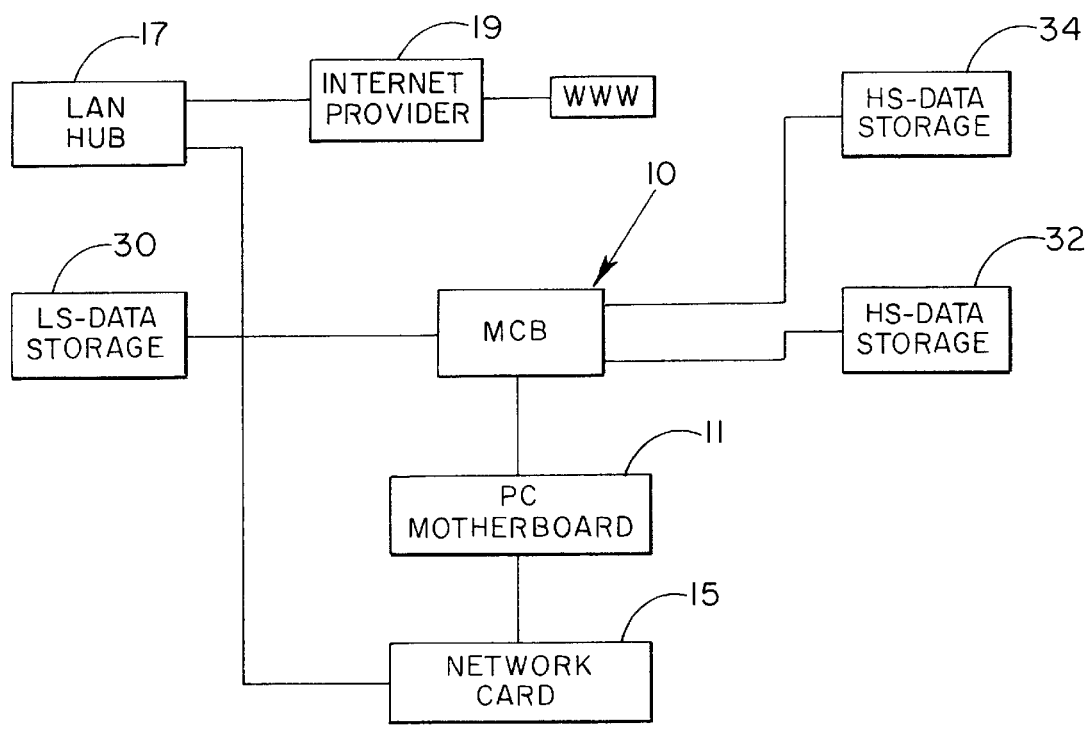
FIG. 3 is a schematic diagram showing an MCB logically connected to multiple hard disks, only one of which is selectively connected to an external network via a LAN hub.

In a preferred embodiment of the invention, MCB 10 dynamically controls the activation status of multiple hard disks in a single computer. As is shown in FIG. 3, MCB 10 operably controls hard disks 30, 32, 34, respectively. Thus, MCB 10 allows a single computer to have the discrete function of multiple computers by selectively automatically switching activation status of the respective hard disks. A preferred application arises when an external connection is made to a computer network such as the internet via a LAN hub 17 and internet modem 19. Whenever the network connection is established, only the designated network hard disk 30 is active, while non-network hard disks 32, 34 are inactive, as set by MCB 10. When toggling to a higher security data storage unit, one of the non-network hard disks 32, 34 is designated as the boot hard disk and is activated. In instances where data downloaded from the network is needed on the non-network hard disks 32, 34, MCB 10 configures network disk 30 as a slave to one or more of the non-network disks 32, 34 which are configured as master. In this configuration, the network hard disk 30 is an additional data storage structure for purposes of data transfer of downloads received through the network. Network disk 30 is secure when disconnected from the network, and data can be safely transferred to secure hard disks 32, 34 so long as precaution is taken to prevent viruses from being transferred along with the data.

Figure 4:
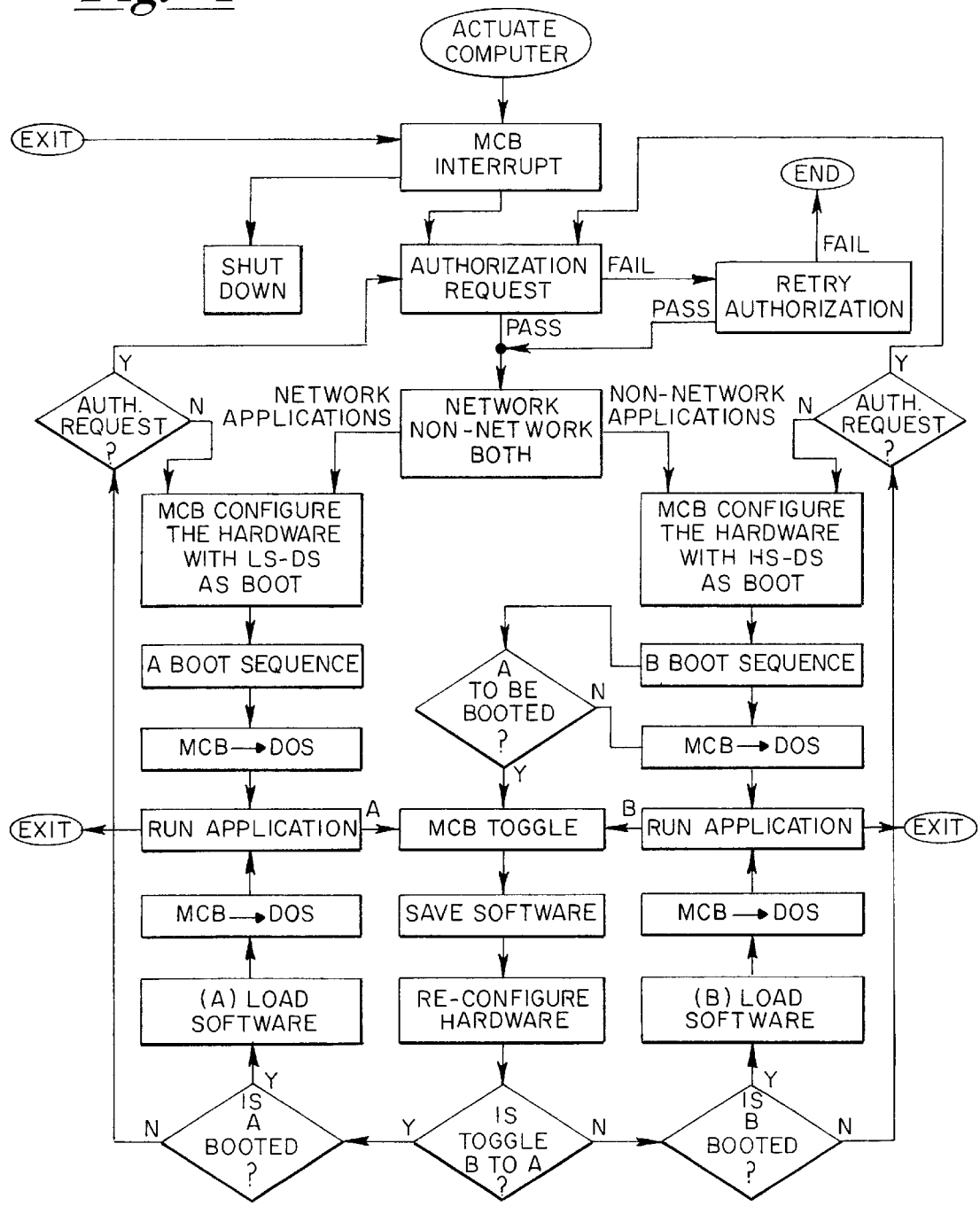
FIG. 4 is a flowchart describing the dynamic switching process enabled by the MCB.

The MCB accomplishes the dynamic switching (toggling) as shown in the flowchart of FIG. 4 and as follows. In the embodiment described with reference to FIG. 4, a first hard disk is designated for network applications, and a second hard disk is designated for non-network applications wherein no external network connection, such as to the internet, is active. A computer having MCB 10 incorporated therein is actuated by pressing the power switch. The MCB Read only program code (Software) is embedded in the MCB. This control software interrupts the boot-up sequence prior to Bios, and thereafter controls the boot-up process. The MCB directs the user to select between network applications and non-network applications or both. In some embodiments, the MCB may require the user to provide identification information to gain access to the system, or to gain access to certain portions of the system. Password information/verification is embedded in the MCB.

Where the authorized user selects network applications, the MCB automatically sets the configuration so that the lower security (LS) network disk is booted and the higher security (HS) non-network disk is turned off. The boot-up sequence is then completed, thereby activating the network hard disk and leaving the non-network disk deactivated.

If the authorized user chooses to engage in non-network applications by selecting a non-network icon at the MCB interruption point, the MCB automatically reconfigures the non-network hard disk to boot up if has not already been done and the network hard disk is configured as a data disk. The boot-up sequence is then completed, thereby activating the non-network hard disk, and leaving the network disk deactivated. Since the MCB controls both the power and the read/write lines of the IDE, one or more of such elements for the network disk may need to be deactivated to ensure absolute security.

When finished with applications of one type, the user may shut down the system, or may use the toggle function to switch to other level of security hard drives. This switching action is carried out by the toggle function embedded in the MCB. In some embodiments, a "toggle" icon is provided on the user interface such that the MCB toggle function may be enabled by, for example, clicking a remote pointer device such as a mouse when the on-screen pointer is superimposed over the toggle icon.

Once the toggle function of the MCB is activated, the MCB interrupts communication to the network hard disks and subsequently pushes all CPU registers onto a stack, or holding position. MCB then creates a memory map of the current application by copying RAM and video data, and if necessary BIOS information, to the associated hard disks. The MCB then initiates a reconfiguration function which connects alternate data device(s) and once the hardware is correct, the MCB initiates the restore software function of the toggle software and when compete returns control to the application previously running. The above process can be reversed when the user needs to toggle back to the other disks. In preferred embodiments, no shut down or re-booting is necessary to complete the toggle function.

The hardware configuration processes stated above are made such that the desired hard disk is activated while the remaining hard disks are deactivated or made active only as data disks in the pre-selected LS and HS hardware configurations. In preferred embodiments, however, such re-configuration occurs without having to perform the re-boot procedure if both network and non-network data storage hard drives have been previously been booted. In such a manner, data flow will be directed to the desired hard disk. The MCB toggle function, therefore, preferably allows the computer to have the hard disks activated sequentially, but not simultaneously, thereby preventing unwanted data flow between the distinct data storage structures.

When the toggle function is activated the MCB re-configures the hardware so that HS Data Storage unit is the boot disk then re-loads the software from HS. The system is now disconnected from the LAN and WWW/Internet and is a off-line system.

To accomplish the dynamic switching of the activation status of multiple distinct data storage elements, particular hardware settings for the respective data storage elements are preferably adjusted. In particular, the master/slave settings preferably correspond to the desired storage structure to which access is desired. Typically, the computer will automatically boot to the data storage structure identified as "master", unless the master disk is disabled. Therefore, to switch from a master storage structure to a slave storage structure, the master storage structure is preferably disabled by physically or electronically disabling the respective IDE cable. In such a manner, the disabled disk is unable to be read or written to, thereby disconnecting data flow thereto. When switching from the slave disk to the master disk, the respective master IDE cable is preferably re-enabled.

In another embodiment of the present invention, the MCB may control the activation status of multiple server/LAN systems connected to a single computer having multiple hard disks. Here, the MCB selectively switches the computer connection from one server/LAN to other server/LAN systems. By this technique, there may be two or more disconnected server/LAN systems each having different levels of connectivity, security, identification, and password protection.

Figure 5:
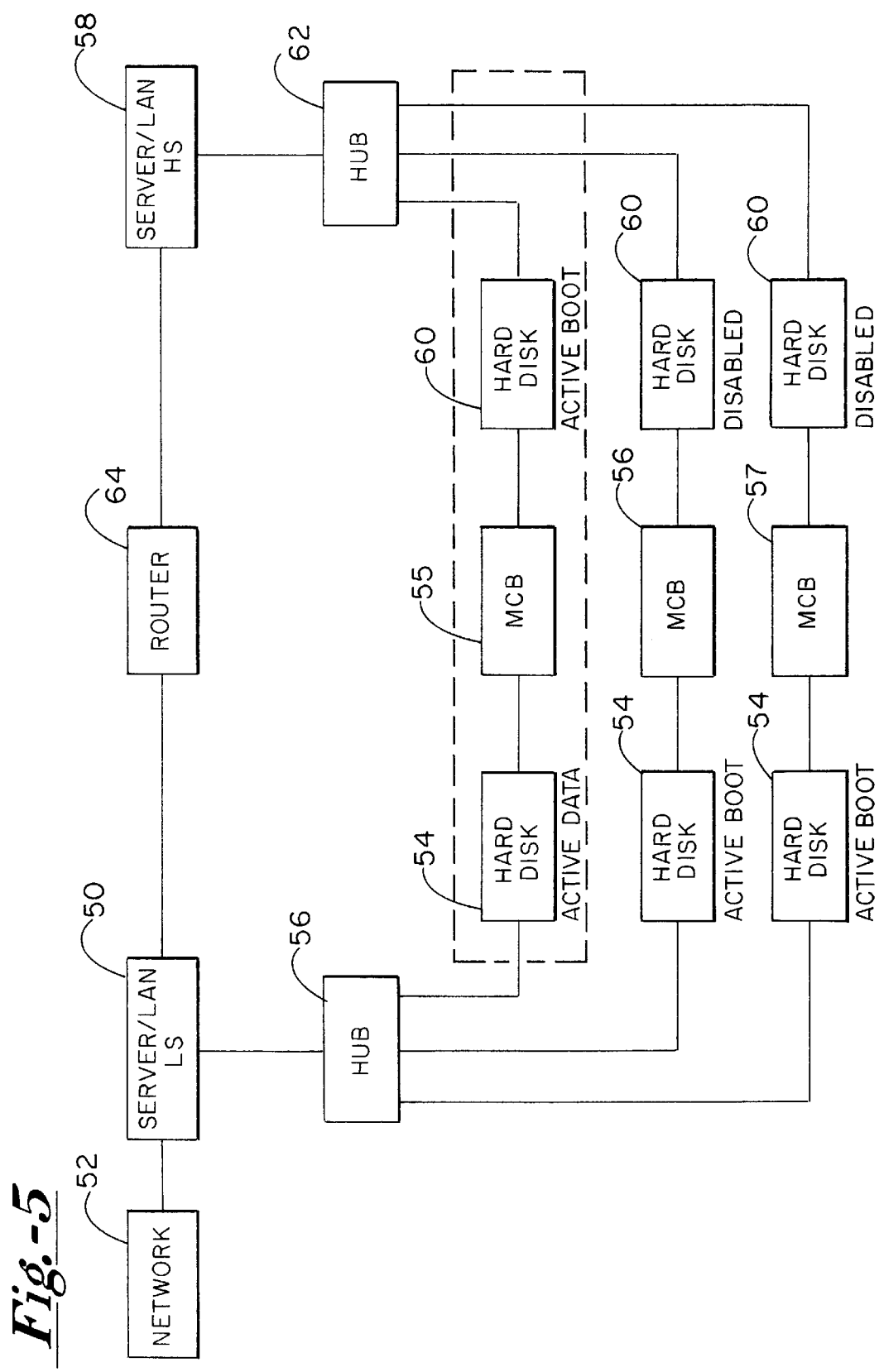
FIG. 5 is a schematic diagram showing multiple computers having MCBs in a multiple server/LAN environment.

A schematic of multiple independent server/LAN systems connected to a single computer having multiple hard disks is shown in FIG. 5. Server/LAN 50 is shown operably coupled to a computer network 52 (WWW/Internet) and to network (LAN) computers 55–57 and associated hard disks 54 through network hub 56. Server/LAN 58 is shown operably coupled only to non-network hard disks 60 through non-network hub 62 such that server/LAN 58 may only be accessed via non-network hub 62. Server/LAN 58 has no connection to network 52 except through server router 64. Router 64 allows only authorized transactions to occur between server/LAN 50 and server/LAN 58, thus acting as a firewall between the respective server/LAN systems 50, 58.

Access to network server/LAN 50 from an unknown user is possible, and may be necessary for desired network operations. Some applications, however, may require additional non-network server/LAN 58 systems to which unauthorized users are not provided access. Such an arrangement requires multiple hard disks to maintain the desired server/LAN separation. Thus, MCB-equipped computers, 55,56,57 are preferably utilized so that multiple hard disks within a single computer may be dynamically activated and deactivated for appropriate configuration to be either on Server 50 or 58. Such a preferred system allows general network access while maintaining secure data on a distinct server/LAN 58 having restricted access and connected to common MCB equipped computers 55,56,57.

Preferably, the MCBs are programmed in conjunction with external switching networks to provide for the use of a single LAN card located in each of the computers 55–57. Switch positions are assigned to LS or HS hard drive function.

Security between network and non-network server/LAN systems is maintained by using appropriate inter-computer software protocols such as user identification, passwords, encryption, and hardware to hardware identification. This approach to firewall protection of the non-network server/LAN provides the highest possible security because only known users have access to the HS storage units.

Figure 7:
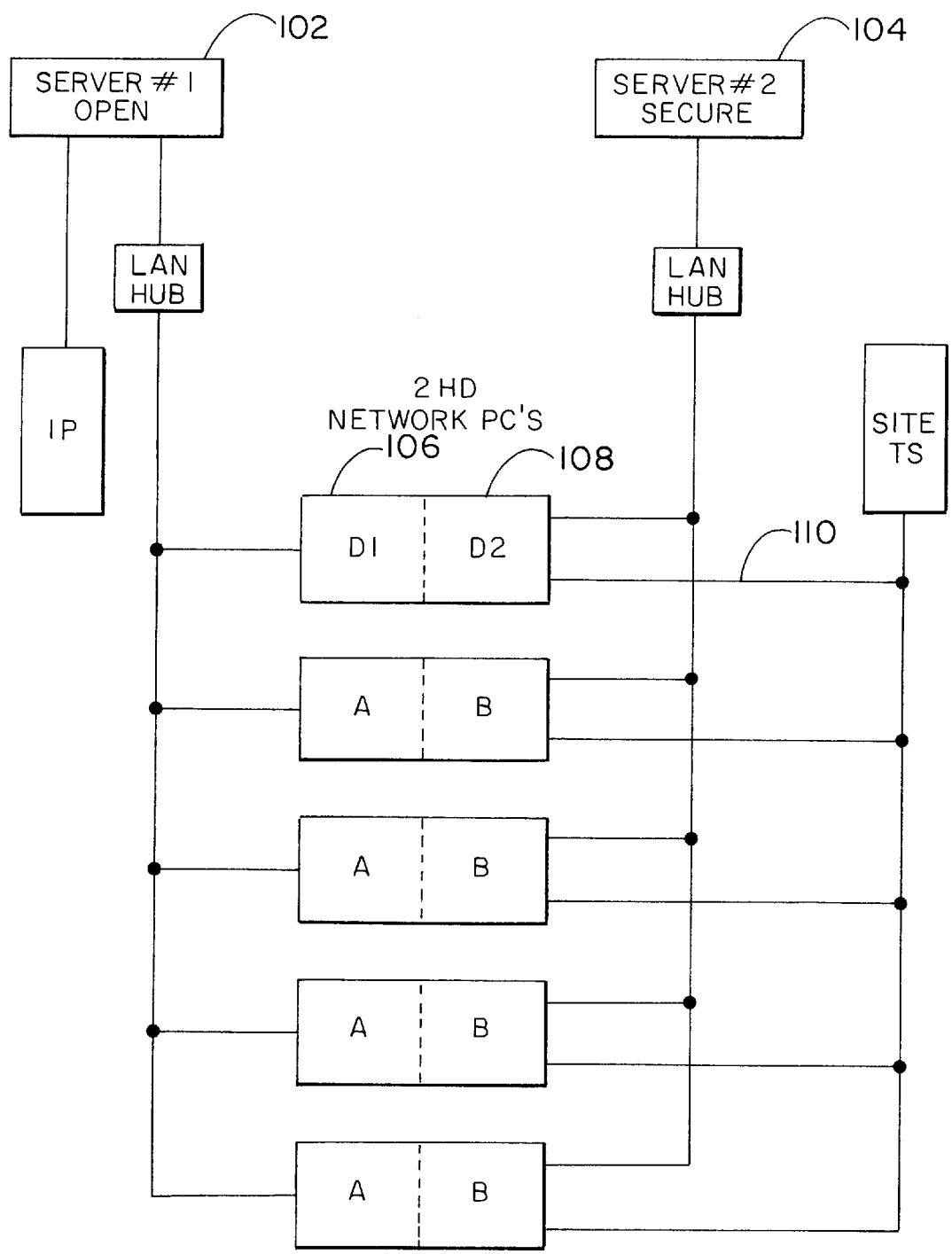
FIG. 7 is a schematic diagram showing multiple MCB containing computers in a server/LAN environment.
Figure 8:
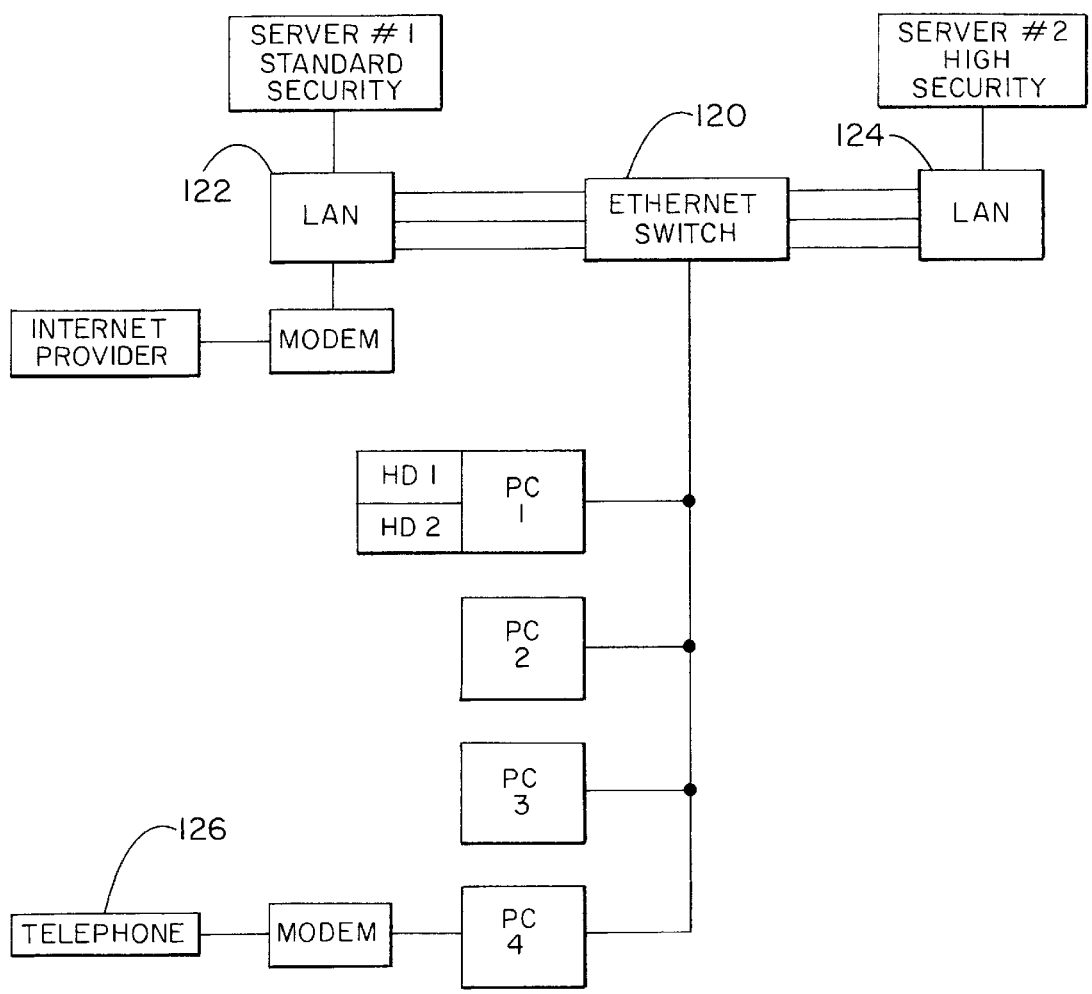
FIG. 8 is a schematic diagram showing multiple MCB containing computers operably coupled to distinct server/LAN systems.

Further alternative embodiments of the present invention are shown in FIGS. 7 and 8. FIG. 7 depicts multiple computers within a local area network (LAN), wherein each LAN computer preferably includes a respective MCB and multiple hard disks. As shown in FIG. 7, each LAN computer has distinct connections to one or more network servers 102 and to one or more non-network servers 104. The distinct connections are preferably operably coupled to respective hard disks 106 108 within respective LAN computers such that designated hard disks 106, 108 may be dedicated to communication with either a non-network server 104, or a network server 102. The MCBs within each LAN computer preferably control respective boot characteristics so that communication and data flow between network hard disk 106 and non-network hard disk 108 are configured so that each server 102, 104 can be sequentially accessed. Users of individual LAN computers, therefore, may alternate communication and data flow between network servers 102 and non-network servers 104 establishing contact between the network servers and the non-network hard disk 108, thereby maintaining the sanctity and security of the non-network hard disks. As further shown in FIG. 7, users having access to individual LAN computers may remotely access respective LAN computers through respective external communication means (telephone modem), as designated at 110, by providing security information such as personal identification, passwords, and so on. Through such an external connection, users may manipulate the MCBs within respective computers to alternatively access network servers 102 and non-network servers 104.

FIG. 8 illustrates a series of computers operably and alternatively coupled to multiple servers. Each computer preferably includes an MCB and at least two hard disks. In such an embodiment, the MCB is responsible for setting boot characteristics and ethernet card settings such that particular hard disks are preferably dedicated to either network servers or non-network servers. Depending on the respective ethernet card settings, therefore, an ethernet controller 120 directs communication and data flow through either network LAN 122 or don-network LAN 124 to reach respective servers. As in systems described above, users may manipulate respective MCBs so as to alternate boot characteristics such that data flow and communication are directed to desired hard disks only, thereby maintaining the security of the non-network hard disks.

Several modifications to the MCB design are possible to achieve desired results in particular applications. For example, RAM memory structures may be added to the MCB to store RAM data during execution of the toggle function, thereby removing the need for external saving steps and logic to communicate with external memory structures. Furthermore, the toggle function speed is increased by enabling RAM to RAM data transfers, which are faster than RAM to hard disk data transfers.

Multiples of the above-described elements may also be added to reduce processing time. Such elements may include multiple processors, multiple buses, and multiple memory structures. If such multiple elements are utilized between one CRT, keyboard, and mouse, toggle function time is significantly reduced.

The invention has been described herein in considerable detail, but the sequential switching of hard disks and their operating systems can be accomplished in different ways. It is to be understood that the invention can be carried out by specifically different devices and that various modifications accomplished the same dual sequential computer systems without departing from the scope of the invention itself.

What is claimed is:

1. A computer system for operably maintaining a plurality of distinct data storage elements having predetermined levels of security designated therefor, and for automatically and dynamically directing data flow to designated ones of said distinct data storage elements having a respective predetermined security level designation that is commensurate with a predetermined risk level of the data flow, said computer system comprising:
   (a) a computer having said plurality of distinct data storage elements operably coupled thereto; and
   (b) automated switching means operably coupled to said computer and being configured for continuously and dynamically controlling the activation status of said plurality of data storage elements, with the activation status of each of said data storage elements being selected from the group consisting of activated and deactivated, the activated activation status enabling direct entry of data into respective data storage elements and the deactivated activation status preventing entry of data into respective data storage elements, said switching means being configured to automatically change the activation status of respective data storage elements in order to switch an activation status from a first set of said data storage elements to a second set of said data storage elements, such automatic activation status change including the steps of:
      (i) interrupting communication to first disk operating system software resident in said first data storage element set;
      (ii) creating a first RAM memory map of application data and said first disk operating system software operation on said first data storage element set;
      (iii) saving said first RAM memory map onto said first data storage element set;
      (iv) reconfiguring electrical connections and hardware settings in said computer to thereby deactivate said first data storage element set and subsequently to activate said second data storage element set; and
      (v) uploading a previously saved second RAM memory map of application data and second disk operation system software previously operating on said data storage element set, such that data flow is automatically and immediately directed exclusively to said second data storage element set.

2. A computer system as in claim 1 wherein less than all of said data storage elements are capable of receiving data from an external connection to a computer network.

3. A computer system as in claim 1 wherein said data storage elements comprise hard disks and operating systems.

4. A computer system as in claim 1 wherein said switching means are selectively enabled by a user of said computer system.

5. A computer system as in claim 1 wherein said switching means completes the activation status change procedure without re-booting or powering down said computer.

6. A computer system as in claim 1 wherein said computer is operably coupled to multiple server/LAN systems.

7. A computer system as in claim 6 wherein less than all of said server/LAN systems are connected to activated ones of said data storage elements.

8. A computer system as in claim 1 wherein predetermined levels of user authorization are required to activate respective said data storage elements.

9. A computer system as in claim 1 wherein said switching means is embodied in a distinct accessory which may be operably coupled to said data storage elements.

10. A computer system as in claim 9 wherein said accessory includes a data storage element integrally formed therewith.

11. A computer system as in claim 10 wherein said accessory data storage element is autonomous from the remainder of said plurality of data storage elements.

12. A computer system as in claim 1 wherein said switching means is configured upon boot-up of said first and second data storage element sets to selectively and dynamically switch the activation status between said first and second data storage element sets without re-booting either of such first and second data storage element sets.

* * * * *